July 6, 1965  P. H. TARTER  3,192,772
WORK-CALIBRATED EXERCISING APPARATUS
Filed Oct. 25, 1961  2 Sheets-Sheet 1

INVENTOR.
PETER H. TARTER
BY
Kenway Jenney & Hildreth
ATTORNEYS

July 6, 1965 P. H. TARTER 3,192,772
WORK-CALIBRATED EXERCISING APPARATUS
Filed Oct. 25, 1961 2 Sheets-Sheet 2

INVENTOR.
PETER H. TARTER
BY
ATTORNEYS

United States Patent Office 3,192,772
Patented July 6, 1965

3,192,772
WORK-CALIBRATED EXERCISING APPARATUS
Peter H. Tarter, 497 Huntington Ave., Boston, Mass.
Filed Oct. 25, 1961, Ser. No. 147,520
7 Claims. (Cl. 73—379)

The present invention relates generally to exercising apparatus, and more particularly to apparatus having means to measure and indicate visually the quantity of energy delivered to the apparatus.

The invention has for its object a device for use in conjunction with suitable work load means for operation by human energy, whether delivered manually or by pedalling, and adapted for operation either in a stationary position or in a vehicular device. Whatever the specific form of exercising means, it is desired to provide a device for indicating the amount of human energy delivered to it in a certain interval of time. This will provide not only a work-measure in units of calories or other like units, but also a value usable in conjunction with a clock to determine and control the average power delivered to the apparatus, or rate of doing work thereon. These data are useful in controlling the use of the exercising apparatus within the limits of medically-recommended practice. Thus a given prescription for exercising may define both average power and total delivered energy for any given period of exercise.

A second object of the invention is to provide a device of simplified construction, yet having the requisite ruggedness and precision of calibration, suitable for popular use on exercising machines in the home or gymnasium, or as attachments to bicycles or other vehicles powered by human energy.

With the foregoing and other objects hereinafter appearing in view, a feature of this invention resides in the provision of a chain drive for the work load device having an idler sprocket wheel resiliently supported to engage the chain, together with a pair of flexible cable means respectively associated with the sprocket wheel and with its support, and further including an analog integrator with a pair of inputs respectively connected to the cable means and with an output device associated with a digit wheel counter. According to this construction, the angle through which the idler sprocket wheel rotates in its support is proportional to the angle through which the driven chain sprocket wheel rotates, and the displacement of the axis of the idler sprocket wheel is a function of the tension on the drive chain. By integration of these functions, a measure of the cumulative energy delivered to the work load device is obtained upon the digit wheel counter.

Other features of the invention reside in certain features of construction, modes of operation and arrangements of the various parts which will be evident from the following description of a preferred embodiment, having reference to the appended drawings in which FIG. 1 is a side elevation of a stationary exercise cycle embodying the invention;

Figure 3:
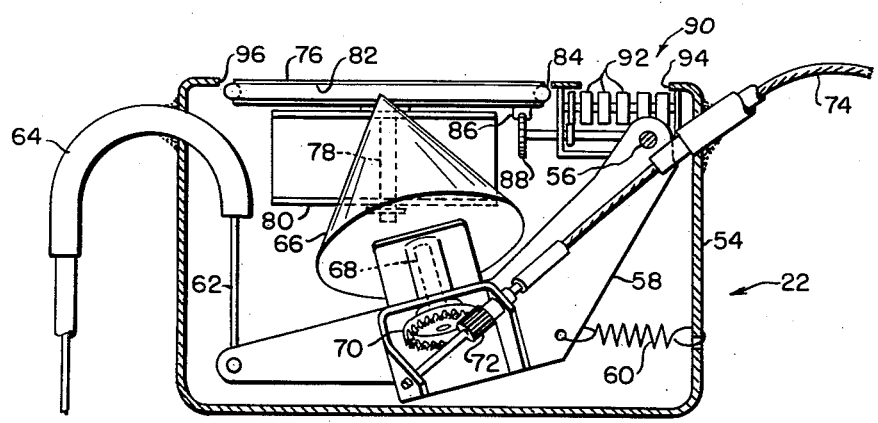
FIG. 3 is a side elevation in section of the work measuring instrument containing the analog integrator and the digit wheel counter.

Referring to the drawings, there is generally shown at 12 a stationary exercise cycle having a rigid frame 14 with feet 16, a seat 18, foot pedals 20, and a work measuring instrument 22. The instrument 22 is more fully illustrated in FIG. 3.

The pedals 20 are keyed to a shaft 24 journalled in the frame 14. A driving chain sprocket wheel 26 is also keyed to the shaft 24. A driven shaft 28 is journalled in the frame 14 and keyed to a driven chain sprocket wheel 30. A link chain 32 is engaged by the teeth of the sprocket wheels 26 and 30, being constructed like the chains commonly used on bicycles, or of any other suitable, known construction. It will be apparent that, as an alternative, one or both of the shafts 24 and 28 may be fixed in the frame, in which case the associated sprocket wheel is journalled for rotation about the shaft.

Also keyed to the driven shaft 28 is a work load device indicated generally at 34, and shown for illustration as comprising a wheel 36 and a roller 38 resiliently engaging the wheel and applying a frictional drag thereto.

The roller 38 forms a part of a frictional drag-applying device 40 operated by a push-pull cable 42 associated with a manual control lever 43. One end of the cable 42 is connected to a lever 44 pivoted in the frame 14. A tension spring 46 is connected between the frame and the lever 44 to tend to oppose tension on the cable 42. The tension on the cable 42, and hence the pressure of the roller 38 upon the rim of the wheel 36, is controlled by selective operation of the handle 43 in a well-known manner.

It will be understood that the particular frictional drag-applying device 40 is shown merely for purposes of description and forms no part of the present invention. Other known equivalent friction-applying devices, preferably having means to vary the frictional drag, may be substituted. Thus I may employ a braking disk clutch or a brake shoe in place of the roller 38.

It will also be observed that the work load device 34 as a whole is also shown merely for purposes of illustration, and that any other known equivalent means may be provided to load the shaft 28. Such means, in general, may be any means for applying a torque resisting that applied by the chain 32, preferably with means for varying the amount of resisting torque either independently of angular velocity or as a function thereof. Thus I may employ devices other than those which convert energy by friction directly into heat, such as known hydraulic or electromagnetic devices. Also, the work load device need not be a stationary one or one which converts all of the applied energy into heat. Thus the wheel 36 may be the powered wheel of a unicycle, bicycle or other multiple-wheeled vehicle. The energy delivered may take the form of kinetic or potential energy, as well as heat. Since the invention is concerned only with the measurement of energy delivered to the driven shaft 28 through the chain 32, a considerable freedom of choice exists as to the application of the invention, and a single preferred application is given only to provide a concrete description.

The tension side of the chain 32 is maintained in a curved configuration over the teeth of an idler sprocket wheel 48 which is journalled in a bracket 50. The bracket 50 is rotatable about the axis of the driven shaft 28, and is urged resiliently to rotate in a direction to apply increasing tension to the chain 32 by a tension spring 52. The spring 52 is secured at one end to the frame 14. A take-up sprocket 54 is also journalled on the bracket 50 and engages the slack side of the chain 32. The function of the sprocket 54 is to maintain an equal number of teeth of the driven sprocket wheel 30 in contact with the chain for different angular positions of the bracket 50.

It will be understood that the function of the bracket 50 is to provide means for sustaining the tension in the chain 32, and it may be pivoted about any suitable axis in the frame 14 other than that of the shaft 28, if desired. Also, the bracket 50 may be resiliently moved in translation, rather than in rotation, since the only necessary feature is that the chain 32 be curved over the teeth of the sprocket wheel 48 in all working positions of the bracket.

By means of the foregoing arrangement, since there is a negligible external load resisting rotation of the idler sprocket wheel 48 about its bearing in the bracket 50, the tension in the chain 32 between the sprocket wheels 26 and 48 equals that between the sprocket wheels 30 and 48. This tension is directly proportional to the torque applied to the driven shaft 28. Also, since the tension in the chain 32 applies a torque to the bracket 50 which is opposed by the tension spring 52, the bracket 50 rotates to a position of equilibrium of these opposing torques; hence, the positions of the bracket 50 may be calibrated in units of torque applied to the driven shaft 28.

The work-measuring instrument 22 is provided with two inputs, one of which is a function of the angular rotation of the idler sprocket wheel 48, and the other of which is a function of the angular position of the bracket 50. Since the angular rotation of the sprocket wheel 48 is directly proportional to that of the driven sprocket wheel 30, it will be recognized that the integration of the two inputs produces an output which is a function of the energy applied to the driven shaft 28. To accomplish this integration, I preferably use the analog integrating device illustrated in FIGS. 3 and 4. This device is mounted in a housing 54 secured to the frame 14 of the exercising apparatus. Pivotally mounted in this housing upon a stud 56 is a bracket 58 resiliently urged counterclockwise, as viewed in FIG. 3, by a tension spring 60. Opposing the spring 60 is a push-pull wire 62 axially slidable in a sheath 64 and attached at its opposite end (FIG. 2) to the bracket 50. It will be understood that the spring 60 is very weak as compared to the spring 52, whereby there is negligible tension on the wire 62.

Figure 1:
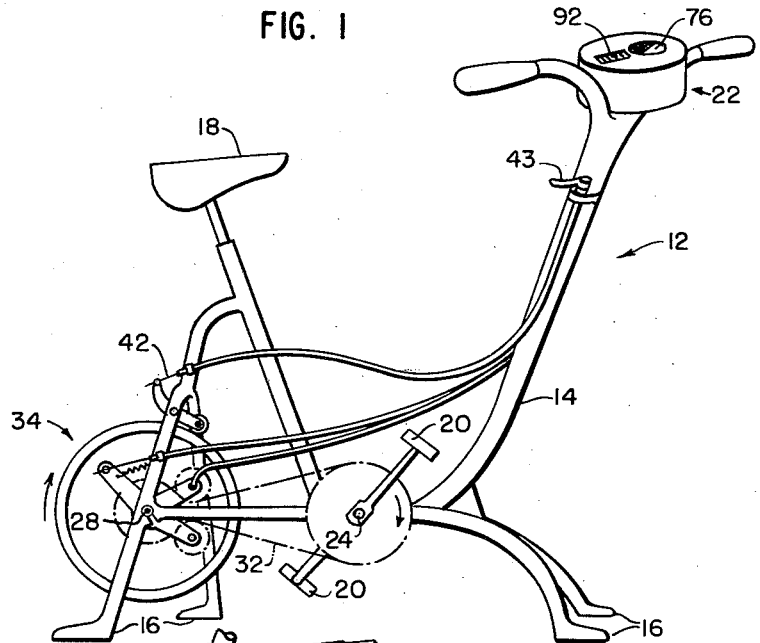
Figure 2:
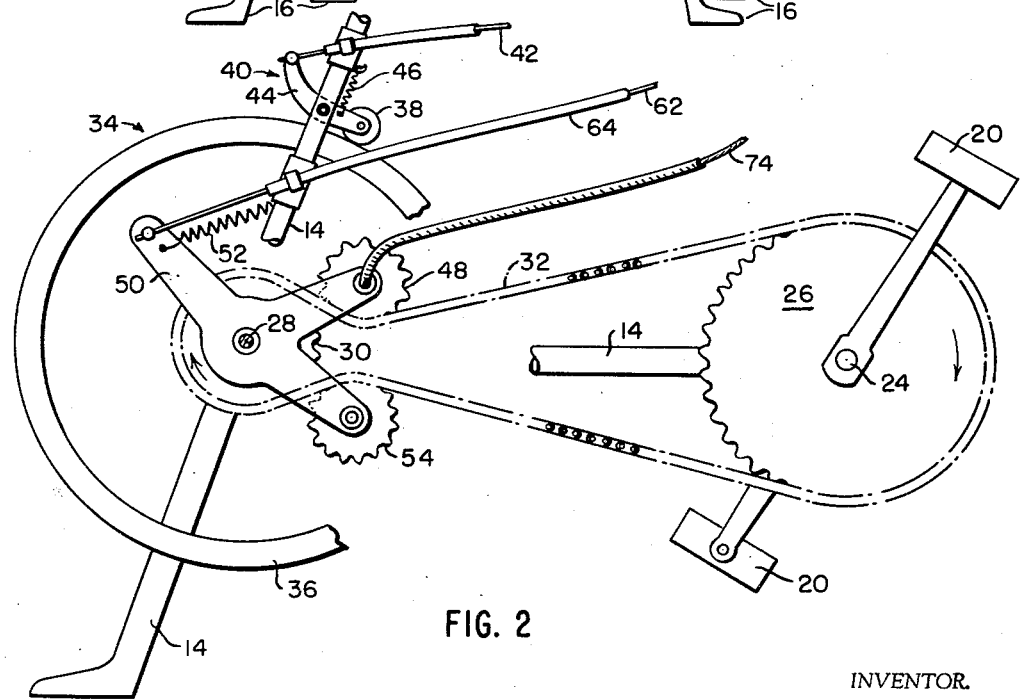
FIG. 2 is a fragmentary enlarged view of a portion of FIG. 1.

A conical member 66 fixed to an axial shaft 68 is pivotally supported in bearings suitably provided in the bracket 58. A crown gear 70 is secured to one end of the shaft 68 and is engaged by a pinion 72. The pinion 72 is secured to a flexible shaft 74 of conventional construction, the other end of which is secured to the idler sprocket wheel 48 (FIG. 2).

A wheel 76 is pivotally mounted on a shaft 78 supported on a fixed axis in the frame 54. The frame 54 is provided with a bracket 80 having bearings for the shaft 78.

The peripheral surface of the conical member 66 is frictionally engaged with the wheel 76. To insure good frictional contact, I preferably provide an annular groove 82 around the rim of the wheel 76, and fit a ring of rubber 84 within the groove so that it projects radially outwardly of the wheel into frictional contact with the surface of the conical member 66. A suitable spring (not shown) attached to the bracket 58 may also be used to urge the conical member 66 into contact with the wheel 76.

The wheel 76 has a projecting pin 86 which engages an indexing wheel 88 forming a part of a conventional digit wheel counter designated generally at 90. The counter 90 has individual digit wheels 92 arranged to count revolutions of the wheel 76. Numerals are provided upon the cylindrical surfaces of the wheels 92 for visual observation through an opening 94 in the housing 54.

Figure 4:
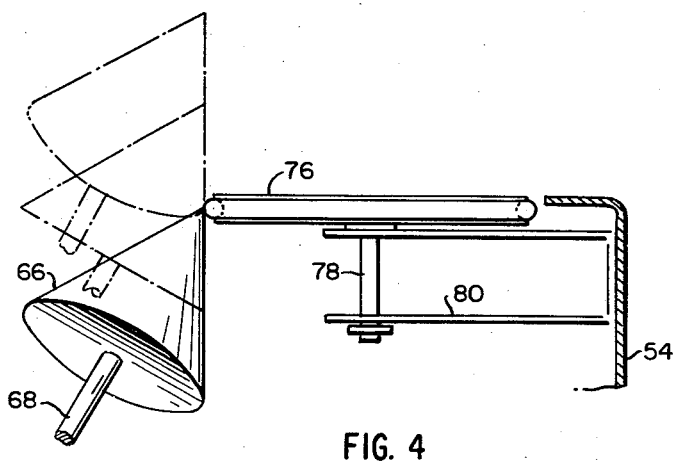
FIG. 4 is a view taken at right angles to FIG. 3 and serving to illustrate the principal of operation of the integrator.

As shown in FIG. 4, the angle which the shaft 68 makes with the surface of the cone (that is, one-half the apex angle) equals the angle which that axis makes with the axis of the shaft 78 when the two are intersecting. The conical member 66 frictionally engages the wheel 76 in all angular positions of the bracket 58 because the conical member is rotated about an axis parallel to the plane of the wheel 76 and to the plane which the axes of the shafts 68 and 78 form when the two are intersecting.

The foregoing device operates upon the familiar analog integration principle to produce an angular rotation of the wheel 76 corresponding to the integral of the distance between the axis of the conical member 66 and its point of frictional contact with the wheel 76, times the differential angular rotation of the conical member 66 about this axis. Accordingly, the angle through which the wheel 76 rotates varies with the amount of energy supplied to the work load device 34.

Theoretically, for the device to operate exactly, there should be a linear relationship between the tension on the chain and the last-mentioned integrated distance. Therefore, I approximate this condition by using a spring 52 having a high spring rate, whereby the angle through which the bracket 50 rotates between extremes is small; and I cause the wire 62 to form approximately a right angle with the arm of the bracket 50 to which it is attached and also a right angle with the bracket 58. Also, I provide sufficient distance between the pivot 56 of the bracket 58 and the point of contact between the conical member 66 and the wheel 76, so that the axis of the shaft 68 translates in a nearly parallel fashion and approximates intersection with the axis of the shaft 78 in all positions of the bracket 58. Obviously, I may also modify the instrument to provide for strictly translatory movement of the bracket 58 in accordance with the foregoing conditions, thus producing direct proportionality between the integrated distance mentioned above and the displacement of the wire 62.

If desired, the wheel 76 may be mounted, as illustrated, in an opening 96 in the housing 54, and provided with different colored segments to produce a visual effect upon rotation indicative of the angular velocity of the wheel.

It will be recognized that numerous variations in structure, including but not limited to those previously discussed, may be incorporated in the apparatus without departing from the spirit or scope of the invention. More particularly, I may use other known forms of analog integrators such as wheel-disk, ball-disk or cone-wheel integrators already known to the art.

Having thus described the invention, I claim:

1. Work-calibrated exercising apparatus having, in combination, a manually rotatable chain driving sprocket wheel, a work load device provided with a chain driven sprocket wheel, a continuous chain connecting said sprocket wheels, an idler sprocket wheel engaging the tension side of the chain, means to support the idler sprocket wheel pivotally with provision to urge it resiliently in the direction of increasing chain tension, a flexible shaft secured to the idler sprocket wheel for rotation therewith, a flexible push-pull wire secured at one end to the idler sprocket wheel support means and adapted for axial translation as a function of chain tension, a digit wheel counter having a visible dial, a frictionally-driven wheel to operate the counter, and an analog integrator to turn the frictionally-driven wheel having a first input device connected to the flexible shaft to rotate therewith and a second input device connected to the other end of the push-pull wire.

2. Work-calibrated exercising apparatus having, in combination, a manually rotatable chain driving sprocket wheel, a work load device provided with a chain driven sprocket wheel, a continuous chain connecting said sprocket wheels, an idler sprocket wheel engaging the tension side of the chain, a bracket pivotally supporting the idler sprocket wheel and rotatable about an axis displaced from that of the idler sprocket wheel and fixed in relation to the driving and driven sprocket wheels, means resiliently urging the bracket to rotate in a direction to produce increasing chain tension, a flexible shaft secured to the idler sprocket wheel for rotation therewith, a flexible push-pull wire secured at one end to the bracket and adapted for axial translation as a function of the angular position of the bracket, a digit wheel counter having a visible dial, a frictionally-driven wheel to operate the counter, and an analog integrator to turn the frictionally-driven wheel having a first input device connected to the flexible shaft to rotate therewith and a second input device connected to the other end of the push-pull wire.

3. The combination according to claim 2, in which the axis about which the bracket is rotated is coincident with that of one of the chain sprocket wheels.

4. The combination according to claim 1, in which the integrator includes a conical member rotatably supported upon an axis forming the same angle with its surface as with the axis of the frictionally-driven wheel, said surface frictionally engaging the periphery of the frictionally-driven wheel, the flexible shaft being connected to rotate said conical member about its axis and the push-pull wire being connected to shift the last-mentioned axis to change the distance from the apex of the conical member to its point of engagement with the frictionally-driven wheel.

5. Work-calibrated exercising apparatus having, in combination, a manually rotatable chain driving sprocket wheel, a work load device provided with a chain driven sprocket wheel, a continuous chain connecting said sprocket wheels, an idler sprocket wheel engaging the tension side of the chain, means to support the idler sprocket wheel pivotally with provision to urge it resiliently in the direction of increasing chain tension, a flexible shaft secured to the idler sprocket wheel for rotation therewith, a flexible cable device secured at one end to the idler sprocket wheel support means and adapted for movement as a function of chain tension, a digit wheel counter having a visible dial, a frictionally-driven wheel to operate the counter, and an analog integrator to turn the frictionally-driven wheel having a first input device connected to the flexible shaft to rotate therewith and a second input device connected to the other end of said cable device.

6. Work-measuring apparatus having, in combination, a flexible member formed in a continuous loop, a driving wheel engaged with the loop, a load-applying driven wheel engaged with the loop, an idler wheel engaging the tension side of the loop between the driving and driven wheels, means to support the idler wheel with provision to urge it resiliently in the direction of increasing loop tension, a flexible shaft adapted to be rotatably driven at a velocity proportional to that of said loop, a flexible cable device secured at one end to the idler wheel support means and adapted for movement as a function of loop tension, a digit wheel counter having a visible dial, a frictionally-driven wheel to operate the counter, and an analog integrator to turn the frictionally-driven wheel having a first input device connected to the flexible shaft and a second input device connected to the other end of said cable device.

7. The combination according to claim 6, in which the integrator includes a conical member rotatably supported upon an axis forming the same angle with its surface as with the axis of the frictionally-driven wheel, said surface frictionally engaging the periphery of the frictionally-driven wheel, the flexible shaft being connected to rotate said conical member about its axis and the flexible cable device being connected to shift the last-mentioned axis to change the distance from the apex of the conical member to its point of engagement with the frictionally-driven wheel.

References Cited by the Examiner
UNITED STATES PATENTS

| | | | |
|---|---|---|---|
| 747,294 | 12/03 | Blaisdell | 73—379 |
| 1,694,509 | 12/28 | Klemperer | 73—144 |
| 1,744,607 | 1/30 | Baine | 272—73 |

FOREIGN PATENTS 570,273  12/57  Italy.

RICHARD C. QUEISSER, *Primary Examiner.*